United States Patent
Grunert et al.

(10) Patent No.: US 7,791,316 B2
(45) Date of Patent: Sep. 7, 2010

(54) BATTERY WITH ISOLATED CHARGING CIRCUIT FOR LMR PORTABLE RADIO APPLICATIONS

(75) Inventors: David R. Grunert, Coleman Falls, VA (US); Shane Miller, Lynchburg, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 295 days.

(21) Appl. No.: 10/896,474

(22) Filed: Jul. 22, 2004

(65) Prior Publication Data

US 2006/0028181 A1    Feb. 9, 2006

(51) Int. Cl.
*H02J 7/00* (2006.01)

(52) U.S. Cl. .................. 320/138; 320/154

(58) Field of Classification Search ........... 320/138, 320/150, 154
See application file for complete search history.

(56) References Cited

U.S. PATENT DOCUMENTS

| | | | |
|---|---|---|---|
| 5,241,258 A | | 8/1993 | Cheon .................. 320/23 |
| 5,721,481 A | * | 2/1998 | Narita et al. ............ 320/111 |
| 6,381,156 B1 | * | 4/2002 | Sakai et al. ............ 363/65 |
| 6,602,627 B2 | * | 8/2003 | Liu et al. ............ 429/23 |
| 2001/0004202 A1 | * | 6/2001 | Park ............ 320/132 |
| 2004/0075418 A1 | | 4/2004 | Densham et al. ............ 320/111 |

FOREIGN PATENT DOCUMENTS

| EP | 0 731 549 A2 | 9/1996 |
|---|---|---|
| GB | 2 262 401 A | 6/1993 |

* cited by examiner

*Primary Examiner*—Edward Tso
*Assistant Examiner*—Aaron Piggush
(74) *Attorney, Agent, or Firm*—Fox Rothschild, LLP; Robert J. Sacco

(57) ABSTRACT

A system of optimally recharging a battery cell while powering a device connected to the battery pack, in which an electronic switch connects a battery pack power-output either to the battery cells or to a second power-input contact. When not recharging, the battery-pack power-output contact is connected to the battery cells, thereby powering the device from the cells. When recharging via a charging unit, the battery pack's power-output terminal is uncoupled from the cells and coupled to a power source of the charging unit, thereby powering the device from the charging unit. At the same time, a voltage is supplied to the battery cells, thereby recharging them. The switching may be activated by a voltage supplied by the charging unit to a temperature monitoring thermistor in the battery pack. In this way, the battery pack's power output may be automatically switched whenever it is placed in the charging unit.

11 Claims, 1 Drawing Sheet

BATTERY WITH ISOLATED CHARGING CIRCUIT FOR LMR PORTABLE RADIO APPLICATIONS

FIELD OF THE INVENTION

The present invention relates to rechargeable battery technology, and particularly to rechargeable batteries capable of being recharged while simultaneously providing isolated power to an output of the battery.

BACKGROUND OF THE INVENTION

Rechargeable batteries are used extensively to power portable devices such as portable radios, cellular phones and laptop computers.

In certain applications, it may be desirable to use a device powered by a rechargeable battery while the battery is being recharged. For instance, many Land Mobile Radio (LMR) applications have hand-held, portable radios that can be recharged in vehicle-based recharging units. To reduce the number of radios and battery packs, it is highly desirable to use the radios in the vehicle while their batteries are being recharged. It is also desirable that the battery pack remain attached to the radio during recharging, so that when the radio is removed from the charging unit, it is immediately available for portable use.

In a conventional rechargeable battery pack, the recharging line and the device power line are both connected to the same terminal of the cell-stack. When a device attached to such a battery is used during recharging, a single voltage is applied to both the cell-stack and the device. The battery charger can, therefore, only monitor the combined current being supplied to the cell-stack and to the radio. Not being able to monitor the current to the cell-stack alone makes it difficult for the charger to determine the state and rate of recharging. As a result, the battery may be over charged, or charged too quickly. Both of these damage a battery through overheating, and lead to considerably reduced battery life.

This damage may be avoided by deliberately charging the battery at a rate well below the maximum allowable charge rate, and ending the charge well short of maximum battery capacity. This is, however, not acceptable to most industrial and professional users, such as emergency service providers, who are highly desirous of always having the rechargeable batteries in their equipment charged to full capacity.

What is needed is a battery pack having an isolated charging circuit, so that it can be accurately, quickly and fully recharged while attached to a device, and while that device is capable of being operated.

SUMMARY OF THE INVENTION

Briefly described, the invention provides a system and method of charging a rechargeable battery pack while simultaneously providing isolated power to an output of the battery pack. An objective of the invention is to provide optimal recharging of a battery pack while the battery pack is attached to a device, and the device is capable of being operated.

A rechargeable battery pack typically has a power-output terminal connected to a cell-stack for powering a device. To recharge the battery pack, a suitable charging voltage is applied to the cell-stack via a first power-input terminal. In a preferred embodiment of the present invention, when the battery is being recharged, the power-output terminal is switched from being connected to the cell-stack to being connected to a second power-input terminal. A suitable, device-powering voltage is applied to the second power-input terminal, now connected to the power-output terminal, thereby powering the device. In this way, isolated power may be made available to power a device while the battery pack is being charged.

In a preferred embodiment, the battery pack may include a thermistor circuit for monitoring the cell-stack during recharging. The thermistor power terminal, used to supply power to the thermistor, may be connected to a control terminal of a switching circuit, so that when the battery pack is placed in a charging unit, the voltage supplied to the thermistor for battery monitoring also controls the switching circuit. In this way, the battery pack's power output may be automatically switched from the cell-stack to the second power-input terminal whenever the battery pack is placed in a charging unit.

In a preferred embodiment, a make-before-break switch may be used to connect the power-output terminal to the second power-input terminal before disconnecting the power-output contact from the cell stack, thereby avoiding any momentary loss of power to the device and any resetting of the device's state.

These and other features of the invention will be more fully understood by references to the following drawings.

DETAILED DESCRIPTION

The present invention applies to rechargeable battery technology, and particularly to enabling a rechargeable battery to be recharged while the device it powers is in use.

Battery packs conventionally have multiple power-input terminals (also known as "contacts"), only one of which is actively connected to the cell stack, depending on the chemistry of the cell stack. Battery packs also conventionally include a thermistor to monitor the temperature of the battery during charging, and a separate thermistor terminal for supplying voltage to the thermistor. One objective of the current invention is to make use of these existing features of battery packs to provide a rechargeable battery that can be recharged while the device is in use.

An exemplary embodiment of the inventive concepts of the present invention will now be described by reference to the accompanying drawings, in which like numbers indicate like elements.

Figure 1:
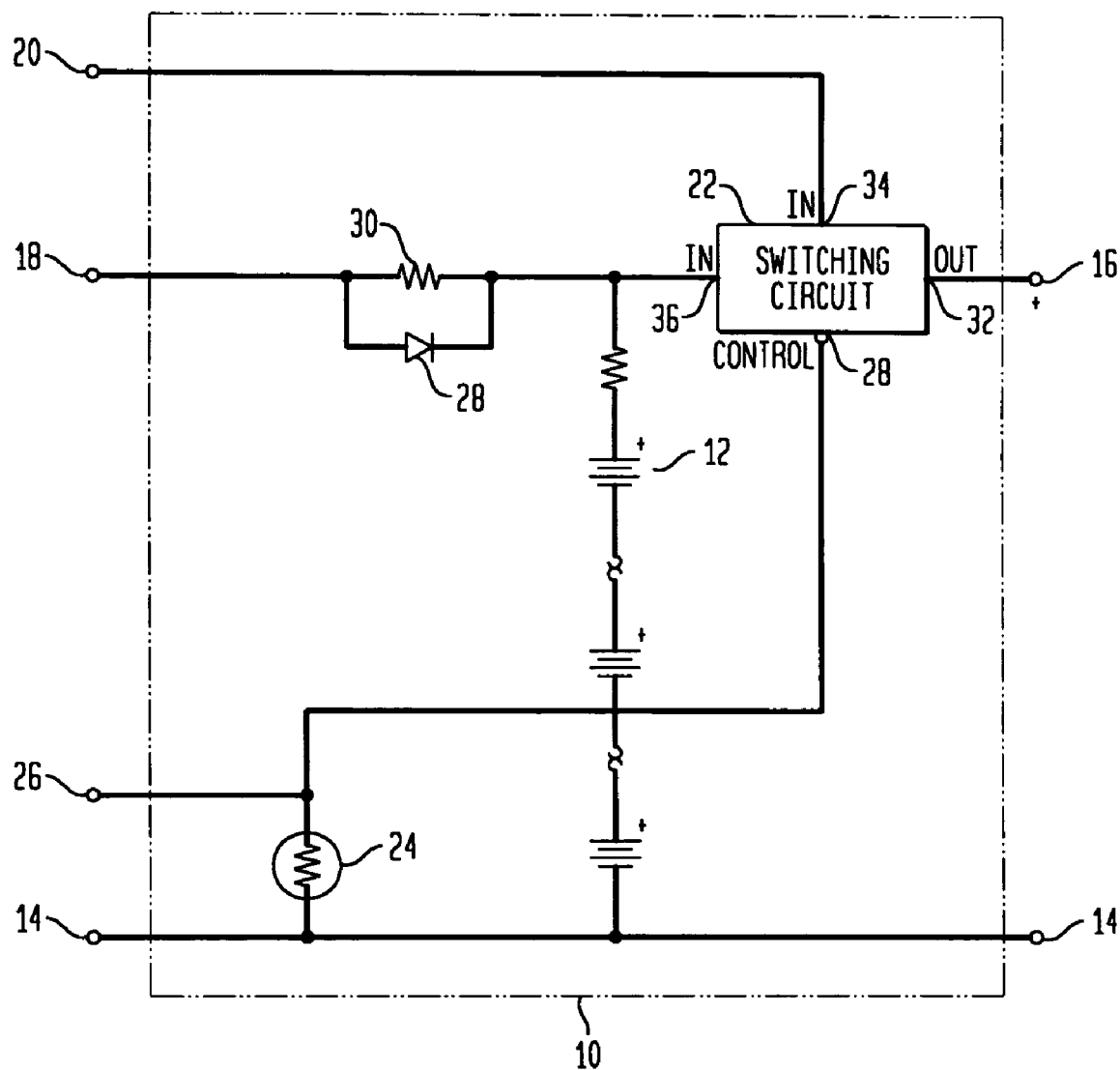
FIG. 1 represents a schematic circuit diagram of an exemplary embodiment of the present invention.

FIG. 1 represents a schematic circuit diagram of an exemplary embodiment of the present invention comprising a battery pack housing 10, a stack of cells 12, ground terminals 14, a power-output terminal 16, a first power-input terminal 18, a second power-input terminal 20, a switching circuit 22, a thermistor 24, a thermistor contact 26, a diode 28 and a resistor 30.

The rechargeable cells 12 may be any of the well known rechargeable cell technologies such as, but not limited to, nickel cadmium (NiCd), nickel metal hydride (NiMH) or lithium ion technology. The battery power output terminal 16 and the battery ground terminal 14 are used to provide power to a device, for example a land mobile radio, when the battery pack is attached to that device. The battery charging terminal 18 and the battery ground 14 are used to obtain power from a charging unit when the battery pack is attached to the charging unit for the purpose of charging the battery. The thermistor contact 26 is normally used to obtain current from the charging unit to power the thermistor 24 when the battery pack is attached to the charging unit.

In prior art systems, both the battery charging terminal 18 and the battery alternate charging terminal 20 may be used to obtain power from the charging unit for recharging the cell 12. This arrangement allows the appropriate voltage and power for the battery cell technology of the particular battery pack to be provided by the charging unit during recharging of the battery cell. In these prior art systems, the selection of which of terminals 18 and 20 is used during recharging is made using a preset switch within the battery pack.

In a preferred embodiment of the invention, only battery charging terminal 18 is used to provide power to the cell 12 during charging and an alternative use is made of the contact 20, as described in detail below.

The stack of rechargeable cells 12 is connected to the first power-input terminal 18, appropriate for the chemistry of the cell stack, by means of a charge limiting diode 28 and a resistor 30.

Figure 2:
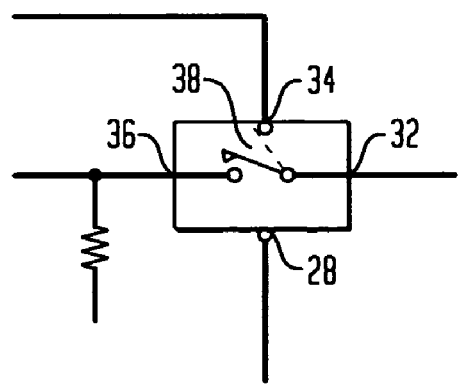
FIG. 2 represents a schematic switch.

The function of the switch 22 is represented in FIG. 2. When the switch control terminal 28 is in a grounded state, the switch bridge 38 is in a first state in which the switch input 36 is connected to the switch output 32. When the switch control 28 has an appropriate, predetermined voltage applied to it, the switch bridge 38 is placed in a second position (shown by dotted lines) in which the switch input 34 is connected to the switch output 32.

The stack of cells 12 is connected to a power-output terminal 16 via a switch input 36 of the switching circuit 22, so that when the control 28 is grounded, a device connected to the battery pack will be powered by the stack of cells 12.

A second power-input contact 20 is connected to the power-output 16 via the switch input 34 of the switching circuit 22, so that when the switch control 28 has a suitable, predetermined voltage applied to it, a device connected to the battery pack will be powered via the terminal 20. In a preferred embodiment, the switching circuit 22 is a high impedance, make-before-break switching circuit based on high impedance, Metal Oxide Silicon Field Effect Transistor (MOSFET) technology.

The thermistor 24 is a well known component of battery packs. The thermistor 24 may be used to monitor the temperature of the cell-stack during recharging by applying a voltage to the thermistor terminal 26 and monitoring the temperature-dependent current that flows through the thermistor. By further connecting the thermistor terminal to the control input 28 of the switching circuit 22, applying a voltage to the thermistor terminal may also cause power-out terminal 16 to be switched from being connected to the stack of cells 12 to being connected to the alternate power-input terminal 20. In this way, when a battery pack 10 is inserted into a battery charger capable of supplying appropriate voltages to the thermistor contact 26, the switching circuit 22 is automatically switched to a state that allows the stack of cells 12 to be charged in isolation through the first power-input terminal 18. That same state of switching circuit 22 also allows power to be supplied directly to the device, via the second power-input contact 20 and the power-output contact 16. As the stack of cells 12 is isolated from any device being operated during charging, the charging current can be accurately monitored by monitoring circuitry in the charging unit. Appropriate, well known charging algorithms can therefore be used, allowing the cells 12 to be charged to full capacity in the shortest time, without overcharging the cell-stack, or any individual cells in the stack.

In a preferred embodiment of the invention, the switching circuit 22 is a make-before-break switch. This means that, when a battery operating a radio is placed into a charging unit, the connection from the power-output terminal 16 will remain connected to the stack of cells 12 until after the power-output terminal 16 has been connected to second power-input 20. As a result, the radio, or any other device, being powered by the rechargeable battery 10, will not experience any transient loss of power. This is important as a transient loss of power may cause a device, such as a radio, to reset its internal settings such as, but not limited, to operating frequencies, contact codes, synchronization schedules or other parameters related to ongoing functioning of the device. The make-before-break switch also functions so that when the battery pack is removed from the charging unit, the device has power from the cell-stack before power from the charger is removed.

In a further embodiment, to further ensure that the make-before-break switch is effective on removing a battery from the charging unit, the thermistor terminal 26 has voltage removed before the alternative power-input terminal 20 has voltage removed. This is necessary because if power was simultaneously removed from both terminals, there would be no time for the switch 22 to connect to the cell-stack 12 without momentary loss of power to the switch output 32. Removing power from the thermistor terminal 26 before alternate power terminal 20 may be accomplished, for instance, by making alternative power-input terminal 20 a spring or levered switch, allowing contact over a range of physical positions. With such a configuration, as the battery pack is removed from the charging unit, thermistor terminal 26 would lose power before alternate power input terminal 20 does, allowing time for a make-before-break function of switch 22 to be effective.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method of charging a rechargeable cell in a battery pack comprising the steps of:
    automatically selectively controlling a switching circuit within said battery pack when said battery pack transitions between a first state during which said rechargeable cell provides power to a load and a second state during which said rechargeable cell is charged by a first power supply;
    in said first state, using said switching circuit to couple said rechargeable cell to a load through an output terminal of said battery pack;
    in said second state using said switching circuit to uncouple said rechargeable cell from said output terminal, and couple a second power supply to said output terminal; and
    selecting said switching circuit so that a second circuit path is provided from said second power supply to said output terminal while a first circuit path, independent of the second circuit path, is concurrently provided to communicate power from the first power supply to the rechargeable cell.

2. The method recited in claim 1, further comprising:
    detecting cell temperature during said second state using a thermistor disposed within said battery pack and coupled to a control terminal of said switching circuit, and applying a control signal having a predetermined voltage to said thermistor.

3. The method recited in claim 2, wherein said step of applying said control signal further comprises placing said battery pack in a charging unit having a thermistor voltage supply and connecting said thermistor voltage supply to said thermistor.

4. The method recited in claim 1, wherein said coupling of said second power supply to said output terminal occurs before said uncoupling of said rechargeable cell from said output terminal.

5. A battery pack apparatus, comprising:
a battery pack housing containing a rechargeable cell stack having a battery power-output terminal;
a first power-input terminal provided on said battery pack housing and connected to said battery power-output terminal of said rechargeable cell stack for charging said cell stack when a first power source is connected to said first power-input terminal;
a second power-input terminal provided on said battery pack housing for providing power to said battery pack when a second power source is connected to said second power-input terminal;
a device power-output terminal provided on said battery pack housing for providing power to a device connected to said battery pack;
a switch provided within said battery pack housing having a first state wherein said device power-output terminal is connected to said first power-input terminal and a second state wherein said device power-output terminal is connected to said second power-input terminal; and
a control circuit responsive to a control signal applied to a control terminal provided on said battery pack for controlling said switch to be in the first state when said rechargeable stack is not being charged by said first power source, and to be in the second state when said rechargeable stack is being charged through said first power-input terminal.

6. The apparatus recited in claim 5, wherein said control circuit comprises a thermistor operable to detect cell temperature during charging, said thermistor coupled to said control terminal and wherein said switch is configured to change from said first state to said second state upon receipt of a predetermined voltage by said thermistor.

7. The apparatus recited in claim 5, wherein said switch comprises a make-before-break switch wherein said second state becomes activated before said first state becomes de-activated.

8. A battery pack device, comprising:
a battery pack housing containing at least one rechargeable cell, said battery pack housing having a control terminal, a power output terminal, a first power input terminal, a second power input terminal, and a circuit configured to connect said rechargeable cell to said first power-input terminal for recharging;
a switching circuit provided within said battery pack housing configured for connecting said power-output terminal to said rechargeable cell when in a first state and connecting said power-output terminal to said second power-input terminal when in a second state;
a control circuit located in said battery pack housing and coupled to said control terminal configured for controlling said state of said switching circuit to be in said first state when said at least one rechargeable cell is not being charged and in said second state when said at least one rechargeable cell is being charged; and
wherein said switching circuit, when in said second state, is configured to concurrently provide a first electrically conductive path between said first power input terminal and said rechargeable cell, and a second electrically conductive path between said second power input terminal and said power output terminal, said first electrically conductive path electrically isolated from said second electrically conductive path.

9. The device recited in claim 8, wherein said control circuit comprises a thermistor coupled to said control terminal operable to measure a temperature of said battery pack, said control circuit responsive to a predetermined voltage applied to said thermistor to selectively control said state.

10. The apparatus recited in claim 8, wherein said switching means comprises a make-before-break switch wherein said second state becomes activated before said first state becomes de-activated.

11. A method of charging a rechargeable cell contained within a battery pack for a portable device, said battery pack including a battery pack housing having a first power-input terminal, a second power-input terminal, a circuit for coupling said rechargeable cell to the first power-input terminal, and a power output terminal coupled to the rechargeable cell in a non-charging state, comprising:
coupling the rechargeable cell to the power output terminal through a switching circuit located in said battery pack housing when said rechargeable cell is not being charged, said switching circuit controlled by a control circuit located in said battery pack; and
coupling the power output terminal to the second power input terminal while uncoupling the power output terminal from the rechargeable cell at said switching circuit when said rechargeable cell is being charged such that the power output terminal and the rechargeable cell concurrently receive power independently of each other.

* * * * *